United States Patent
Damnjanovic et al.

(10) Patent No.: US 11,968,725 B2
(45) Date of Patent: Apr. 23, 2024

(54) LISTEN AFTER TALK PROCEDURE

(71) Applicant: QUALCOMM Incorporated, San Diego, CA (US)

(72) Inventors: Aleksandar Damnjanovic, Del Mar, CA (US); Andrei Dragos Radulescu, San Diego, CA (US); Arumugam Chendamarai Kannan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 16/162,774

(22) Filed: Oct. 17, 2018

(65) Prior Publication Data
US 2019/0132869 A1 May 2, 2019

Related U.S. Application Data

(60) Provisional application No. 62/578,936, filed on Oct. 30, 2017.

(51) Int. Cl.
| | | |
|---|---|---|
| *H04W 74/08* | (2009.01) | |
| *H04W 72/0453* | (2023.01) | |
| *H04W 72/541* | (2023.01) | |
| *H04W 74/00* | (2009.01) | |
| *H04W 74/0833* | (2024.01) | |

(Continued)

(52) U.S. Cl.
CPC ..... *H04W 74/085* (2013.01); *H04W 72/0453* (2013.01); *H04W 74/002* (2013.01);
(Continued)

(58) Field of Classification Search
USPC .......................................... 370/329
See application file for complete search history.

(56) References Cited

U.S. PATENT DOCUMENTS

| | | | |
|---|---|---|---|
| 2009/0016289 A1* | 1/2009 | Li | H04L 1/0025 370/329 |
| 2009/0196245 A1* | 8/2009 | Ji | H04W 52/244 370/329 |

(Continued)

FOREIGN PATENT DOCUMENTS

| | | |
|---|---|---|
| CN | 102090096 A | 6/2011 |
| CN | 106464636 A | 2/2017 |

(Continued)

OTHER PUBLICATIONS

Luo J., et al., "Preliminary Radio Interface Concepts for mm-wave Mobile Communications," Millimetre-Wave based Mobile Radio Access Network for Fifth Generation Integrated Communications (mmMAGIC), Jul. 7, 2016, XP055483469, 232 pages, Retrieved from the Internet: URL: https://bscw.5g-mmmagic.eu/pub/bscw.cgi/d127361/mmMAGIC_D4.1.pdf [retrieved on Jun. 12, 2018].

(Continued)

*Primary Examiner* — Alpus Hsu
*Assistant Examiner* — Hooman Houshmand
(74) *Attorney, Agent, or Firm* — QUALCOMM Incorporated

(57) ABSTRACT

Methods, systems, and devices for wireless communications are described. A transmitter may include an interference avoidance preamble in a wireless transmission. The interference avoidance preamble may identify resources for transmitting an interference avoidance request associated with the wireless transmission. A receiver may experience interference between the wireless transmission and another wireless transmission, and the receiver may transmit the interference avoidance request using the resources identified in the interference avoidance preamble. The transmitter may receive the interference avoidance request and, in response, may enable an interference avoidance mechanism, for example, a listen before talk (LBT) procedure, a frequency- (Continued)

division multiplexing (FDM) scheme, a time-division multiplexing (TDM) scheme, a spatial multiplexing scheme, or a combination.

20 Claims, 12 Drawing Sheets

(51) Int. Cl.
    *H04W 88/02*     (2009.01)
    *H04W 74/0808*     (2024.01)
(52) U.S. Cl.
    CPC .......... *H04W 74/08* (2013.01); *H04W 72/541* (2023.01); *H04W 74/0808* (2013.01); *H04W 88/02* (2013.01)

(56) References Cited

U.S. PATENT DOCUMENTS

| | | | | |
|---|---|---|---|---|
| 2010/0323711 | A1* | 12/2010 | Damnjanovic | ... H04L 25/03821 455/450 |
| 2011/0038332 | A1* | 2/2011 | Liu | ............ H04W 72/1263 370/329 |
| 2012/0257574 | A1* | 10/2012 | Seok | ............ H04W 72/082 370/328 |
| 2015/0030094 | A1* | 1/2015 | Zhang | ............ H04B 7/0626 375/267 |
| 2017/0303144 | A1* | 10/2017 | Guo | ............ H04L 5/1469 |
| 2018/0152851 | A1* | 5/2018 | Li | ............ H04W 16/14 |

FOREIGN PATENT DOCUMENTS

| | | | |
|---|---|---|---|
| CN | 106535334 A | 3/2017 | |
| WO | WO-2016197315 A1 | 12/2016 | |
| WO | WO-2018209553 A1 * | 11/2018 | ........... H04L 12/189 |

OTHER PUBLICATIONS

International Search Report and Written Opinion—PCT/US2018/056513—ISA/EPO—dated Dec. 19, 2018.

* cited by examiner

LISTEN AFTER TALK PROCEDURE

CROSS REFERENCES

The present Application for Patent claims benefit of U.S. Provisional Patent Application No. 62/578,936 by Damnjanovic et al., entitled "Listen After Talk (LAT) Procedure," filed Oct. 30, 2017, assigned to the assignee hereof, and expressly incorporated by reference in its entirety.

BACKGROUND

The following relates generally to wireless communications, and more specifically to listen after talk (LAT) procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

In some wireless communications system, a transmitter may use a collision avoidance scheme to avoid or minimize interference between transmissions from different wireless devices in the network. For example, listen before talk (LBT) procedures may be used to proactively avoid collisions. LBT procedures may involve performing energy detection on a wireless medium and refraining from transmitting when the detected energy exceeds a threshold value.

SUMMARY

The described techniques relate to improved methods, systems, devices, or apparatuses that support listen after talk (LAT) procedures. Generally, the described techniques provide for a first wireless device to perform a wireless transmission to a second wireless device over a channel of a radio frequency spectrum band. The wireless transmission may include a data portion and a preamble that indicates resources for an interference avoidance request corresponding to the wireless transmission. The first wireless device may receive the interference avoidance request from a third wireless device on the indicated resource and, based at least in part on the received interference avoidance request, may enable an interference avoidance mechanism for a subsequent transmission to the second wireless device.

The described techniques also provide for a second device to receive a first wireless transmission from a first wireless device over a channel of a radio frequency spectrum band. The first wireless transmission may include a preamble that includes an indication of resources for an interference avoidance request corresponding to the first wireless transmission. The second device may detect interference with the first wireless transmission caused by a second wireless transmission from a third wireless device. The second device may, based at least in part on the detected resources, transmit the interference avoidance request to the first wireless device.

A method of wireless communications is described. The method may include performing, by a first wireless device, a wireless transmission to a second wireless device, the wireless transmission comprising a data portion and a preamble over a channel of a radio frequency spectrum band and the preamble comprising an indication of resources for an interference avoidance request corresponding to the wireless transmission. The method may include receiving the interference avoidance request from a third wireless device on the indicated resources and enabling an interference avoidance mechanism for a subsequent transmission to the second wireless device based at least in part on the received interference avoidance request.

An apparatus for wireless communications is described. The apparatus may include means for performing, by a first wireless device, a wireless transmission to a second wireless device, the wireless transmission comprising a data portion and a preamble over a channel of a radio frequency spectrum band and the preamble comprising an indication of resources for an interference avoidance request corresponding to the wireless transmission. The apparatus may include means for receiving the interference avoidance request from a third wireless device on the indicated resources and means for enabling an interference avoidance mechanism for a subsequent transmission to the second wireless device based at least in part on the received interference avoidance request.

Another apparatus for wireless communications is described. The apparatus may include a processor, memory in electronic communication with the processor, and instructions stored in the memory. The instructions may be operable to cause the processor to perform, by a first wireless device, a wireless transmission to a second wireless device, the wireless transmission comprising a data portion and a preamble over a channel of a radio frequency spectrum band and the preamble comprising an indication of resources for an interference avoidance request corresponding to the wireless transmission. The instructions may be operable to cause the processor to receive the interference avoidance request from a third wireless device on the indicated resources and enable an interference avoidance mechanism for a subsequent transmission to the second wireless device based at least in part on the received interference avoidance request.

A non-transitory computer-readable medium for wireless communications is described. The non-transitory computer-readable medium may include instructions operable to cause a processor to perform, by a first wireless device, a wireless transmission to a second wireless device, the wireless transmission comprising a data portion and a preamble over a channel of a radio frequency spectrum band and the preamble comprising an indication of resources for an interference avoidance request corresponding to the wireless transmission. The non-transitory computer-readable medium may include instructions operable to cause a processor to receive the interference avoidance request from a third wireless device on the indicated resources, and enable an interference avoidance mechanism for a subsequent transmission to the second wireless device based at least in part on the received interference avoidance request.

In some examples of the method, apparatus, and non-transitory computer-readable medium described herein, the preamble further comprises a physical cell identifier (PCI) associated with the first wireless device.

In some examples of the method, apparatus, and non-transitory computer-readable medium described herein, enabling the interference avoidance mechanism comprises: implementing the interference avoidance mechanism based at least in part on one or more of: a PCI associated with the first wireless device, a PCI associated with the third wireless device, or a combination thereof.

Some examples of the method, apparatus, and non-transitory computer-readable medium described herein may further include processes, features, means, or instructions for receiving the PCI of the third wireless device in a preamble of the interference avoidance request.

In some examples of the method, apparatus, and non-transitory computer-readable medium described herein, enabling the interference avoidance mechanism comprises: applying one or more of: a frequency-division multiplexing (FDM) scheme, a time-division multiplexing (TDM) scheme, a spatial multiplexing scheme, or a combination thereof, to the subsequent transmission over the channel based at least in part on the received interference avoidance request.

In some examples of the method, apparatus, and non-transitory computer-readable medium described herein, enabling the interference avoidance mechanism comprises: implementing the interference avoidance mechanism for a first period of time. Some examples of the method, apparatus, and non-transitory computer-readable medium described herein may further include processes, features, means, or instructions for stopping the implementation of the interference avoidance mechanism after the first period of time.

In some examples of the method, apparatus, and non-transitory computer-readable medium described herein, the first period of time may be between about 1 millisecond and about 1 second.

In some examples of the method, apparatus, and non-transitory computer-readable medium described herein, the first period of time varies based at least in part on one of a channel condition or a traffic condition.

In some examples of the method, apparatus, and non-transitory computer-readable medium described herein, enabling the interference avoidance mechanism comprises: performing a listen before talk (LBT) procedure on the channel prior to performing the subsequent transmission over the channel.

In some examples of the method, apparatus, and non-transitory computer-readable medium described herein, the wireless transmission may be transmitted on a first frequency band. Some examples of the method, apparatus, and non-transitory computer-readable medium described herein may further include processes, features, means, or instructions for enabling the interference avoidance mechanism comprises transmitting one or more additional wireless transmissions to a receiver on a second frequency band, the second frequency band being different than the first frequency band.

A method of wireless communications is described. The method may include receiving, from a first wireless device, a first wireless transmission at a second wireless device over a channel of a radio frequency spectrum band, a preamble of the first wireless transmission comprising an indication of resources for an interference avoidance request corresponding to the first wireless transmission, detecting interference by the first wireless transmission with a second wireless transmission from a third wireless device, and transmitting the interference avoidance request to the first wireless device on the indicated resources based at least in part on the detected interference.

An apparatus for wireless communications is described. The apparatus may include means for receiving, from a first wireless device, a first wireless transmission at a second wireless device over a channel of a radio frequency spectrum band, a preamble of the first wireless transmission comprising an indication of resources for an interference avoidance request corresponding to the first wireless transmission, means for detecting interference by the first wireless transmission with a second wireless transmission from a third wireless device, and means for transmitting the interference avoidance request to the first wireless device on the indicated resources based at least in part on the detected interference.

Another apparatus for wireless communications is described. The apparatus may include a processor, memory in electronic communication with the processor, and instructions stored in the memory. The instructions may be operable to cause the processor to receive, from a first wireless device, a first wireless transmission at a second wireless device over a channel of a radio frequency spectrum band, a preamble of the first wireless transmission comprising an indication of resources for an interference avoidance request corresponding to the first wireless transmission, detect interference by the first wireless transmission with a second wireless transmission from a third wireless device, and transmit the interference avoidance request to the first wireless device on the indicated resources based at least in part on the detected interference.

A non-transitory computer-readable medium for wireless communications is described. The non-transitory computer-readable medium may include instructions operable to cause a processor to receive, from a first wireless device, a first wireless transmission at a second wireless device over a channel of a radio frequency spectrum band, a preamble of the first wireless transmission comprising an indication of resources for an interference avoidance request corresponding to the first wireless transmission, detect interference by the first wireless transmission with a second wireless transmission from a third wireless device, and transmit the interference avoidance request to the first wireless device on the indicated resources based at least in part on the detected interference.

Some examples of the method, apparatus, and non-transitory computer-readable medium described herein may further include processes, features, means, or instructions for enabling a wireless interference avoidance mechanism at the first wireless device based at least in part on the interference avoidance request.

In some examples of the method, apparatus, and non-transitory computer-readable medium described herein, enabling the interference avoidance mechanism comprises: implementing the interference avoidance mechanism based at least in part on one or more of: a PCI associated with the first wireless device, a PCI associated with the third wireless device, or a combination thereof.

In some examples of the method, apparatus, and non-transitory computer-readable medium described herein, enabling the interference avoidance mechanism comprises: applying one or more of: an FDM scheme, a TDM scheme, a spatial multiplexing scheme, or a combination thereof, to a subsequent transmission over the channel based at least in part on the received interference avoidance request.

Some examples of the method, apparatus, and non-transitory computer-readable medium described herein may further include processes, features, means, or instructions for transmitting a PCI of the third wireless device in a preamble of the interference avoidance request.

In some examples of the method, apparatus, and non-transitory computer-readable medium described herein, the second wireless transmission comprises a second preamble comprising an indication of second resources for a second interference avoidance request corresponding to the second wireless transmission.

Some examples of the method, apparatus, and non-transitory computer-readable medium described herein may further include processes, features, means, or instructions for transmitting the second interference avoidance request on the indicated second resources.

In some examples of the method, apparatus, and non-transitory computer-readable medium described herein, the preamble comprises a first PCI associated with the first wireless device.

In some examples of the method, apparatus, and non-transitory computer-readable medium described herein, the interference avoidance request comprises an indication of a second PCI associated with the third wireless device.

Some examples of the method, apparatus, and non-transitory computer-readable medium described herein may further include processes, features, means, or instructions for transmitting an indication of the first PCI to the third wireless device.

In some examples of the method, apparatus, and non-transitory computer-readable medium described herein, the first wireless transmission may be received on a first frequency band. Some examples of the method, apparatus, and non-transitory computer-readable medium described herein may further include processes, features, means, or instructions for subsequent wireless transmissions from the second wireless device may be received on a second frequency band, the second frequency band being different than the first frequency band.

DETAILED DESCRIPTION

Listen before talk (LBT) procedures may be used to avoid or minimize collisions in some wireless communications systems. In millimeter wave (mmW) systems, however, collisions may be avoided through spatial separation due to antenna directionality. As such, LBT procedures may not be effective when switching beams, for example, because LBT requires a dwell time and frequent transmissions of acknowledgements or channel state information feedback from a receiver, which increases overhead from over-the-air signaling.

To reduce the overhead, a transmitter may perform a wireless transmission without performing an LBT procedure. The wireless transmission may include an interference avoidance preamble that indicates resources for receiving an interference avoidance request associated with the wireless transmission. In some examples, the wireless transmission may interfere with ongoing communications between a victim transmitter and a victim receiver (because, e.g., the victim receiver is on the communication path of the wireless transmission). The victim receiver may send an interference avoidance request using the resources identified in the interference avoidance preamble. In response, the transmitter (which may also be called the jamming transmitter) may enable an interference avoidance mechanism. In some examples, the interference avoidance mechanism may be an LBT procedure. That is, the LBT procedure may be performed after determining that the wireless transmission may interfere with ongoing communications. In some other examples, the interference avoidance mechanism may be a frequency-division multiplexing (FDM) scheme, a time-division multiplexing (TDM) scheme, and/or a spatial multiplexing scheme. As such, overhead may be limited until a need for the overhead communications is determined.

Aspects of the disclosure are initially described in the context of a wireless communications system. Aspects of the disclosure are further illustrated by and described with reference to apparatus diagrams, system diagrams, and flowcharts that relate to listen after talk (LAT) procedure.

Figure 1:
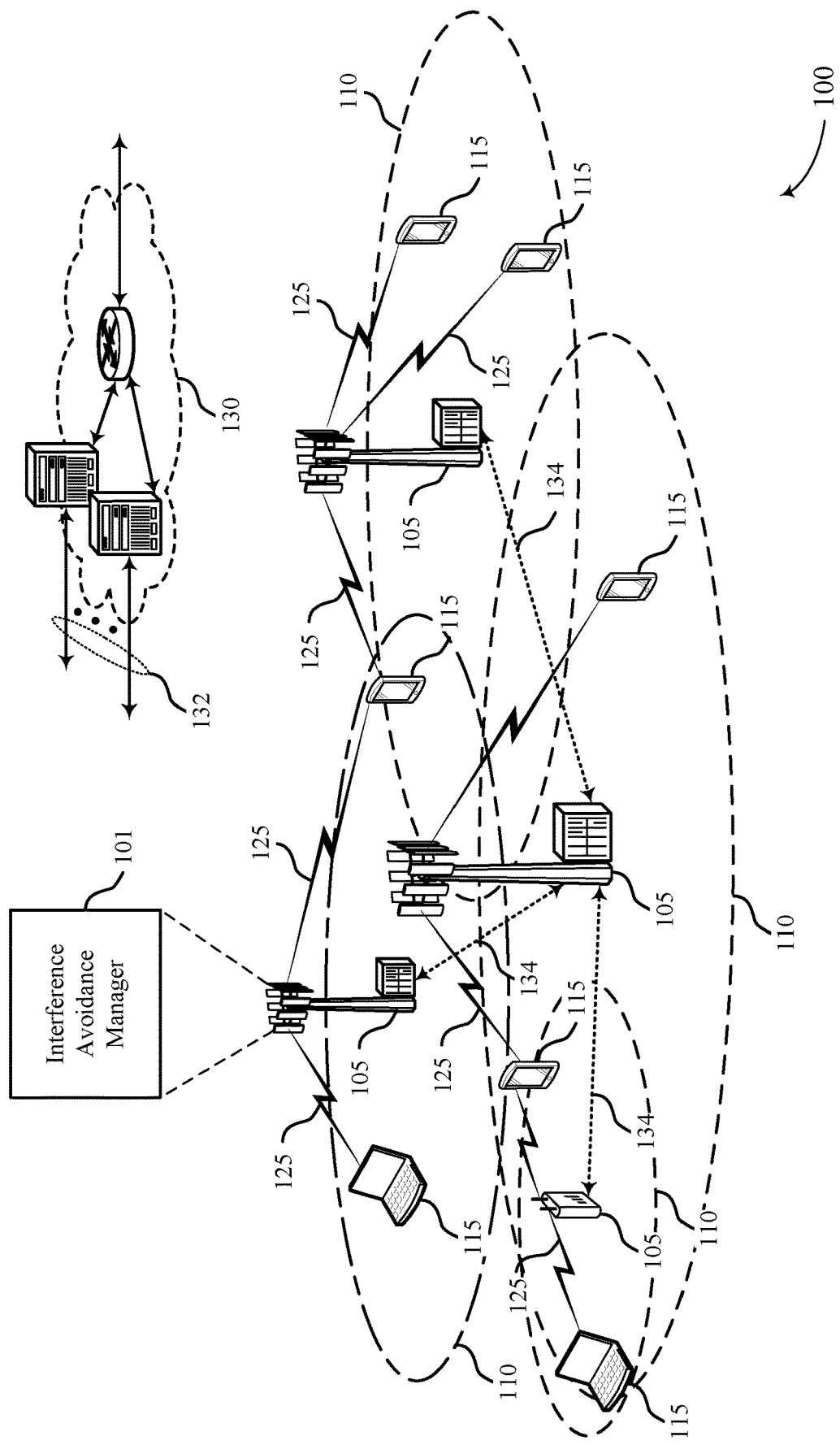
FIG. 1 illustrates an example of a system for wireless communications that supports listen after talk (LAT) procedures in accordance with aspects of the present disclosure.

FIG. 1 illustrates an example of a wireless communications system 100 that supports LAT procedures in accordance with various aspects of the present disclosure. The wireless communications system 100 includes base stations 105, user equipments (UEs) 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, where overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCI), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 and/or the UEs 115 may include an interference avoidance manager 101. The interference avoidance manager 101 may be configured to include an interference avoidance preamble to wireless transmissions. The interference avoidance preamble may include an identification of resources for an interference avoidance request. The interference avoidance preamble may also include a PCI associated with the base station 105 and/or the UE 115. The interference avoidance manager 101 may also cause the base station 105 and/or the UE 115 to listen for a complaint on the identified resources.

The interference avoidance manager 101 may be configured to identify resources for an interference avoidance request in response to receiving an interference avoidance preamble. The interference avoidance manager 101 may also be configured to generate an interference avoidance request in response to detecting interference. In some examples, the interference avoidance request may include a first PCI associated with a victim transmitter (i.e., a transmitter from which transmissions to a receiver may experience interference) and/or a jamming transmitter (i.e., a transmitter from which transmissions to a receiver may cause interference). The interference avoidance manager 101 may also be configured to transmit the interference avoidance request to the victim transmitter and/or the jamming transmitter using the resources identified in the interference avoidance preamble.

The interference avoidance manager 101 may also be configured to enable an interference avoidance mechanism in response to receiving an interference avoidance request. In some examples, enabling the interference avoidance mechanism may include implementing an LBT procedure. In some examples, enabling the interference avoidance mechanism may include implementing an FDM, a TDM, and/or a spatial multiplexing mechanism. In some examples, the interference avoidance mechanism may be dependent on a PCI associated with a victim transmitter and/or a jamming transmitter. The interference avoidance manager 101 may also be configured to disable the interference avoidance mechanism after a first period of time. The first period of time may be, for example, between about 1 millisecond and about 1 second, or between about 100 milliseconds and about 1 second. In some examples, the first period of time may vary based on a channel condition and/or a traffic condition.

Figure 2:
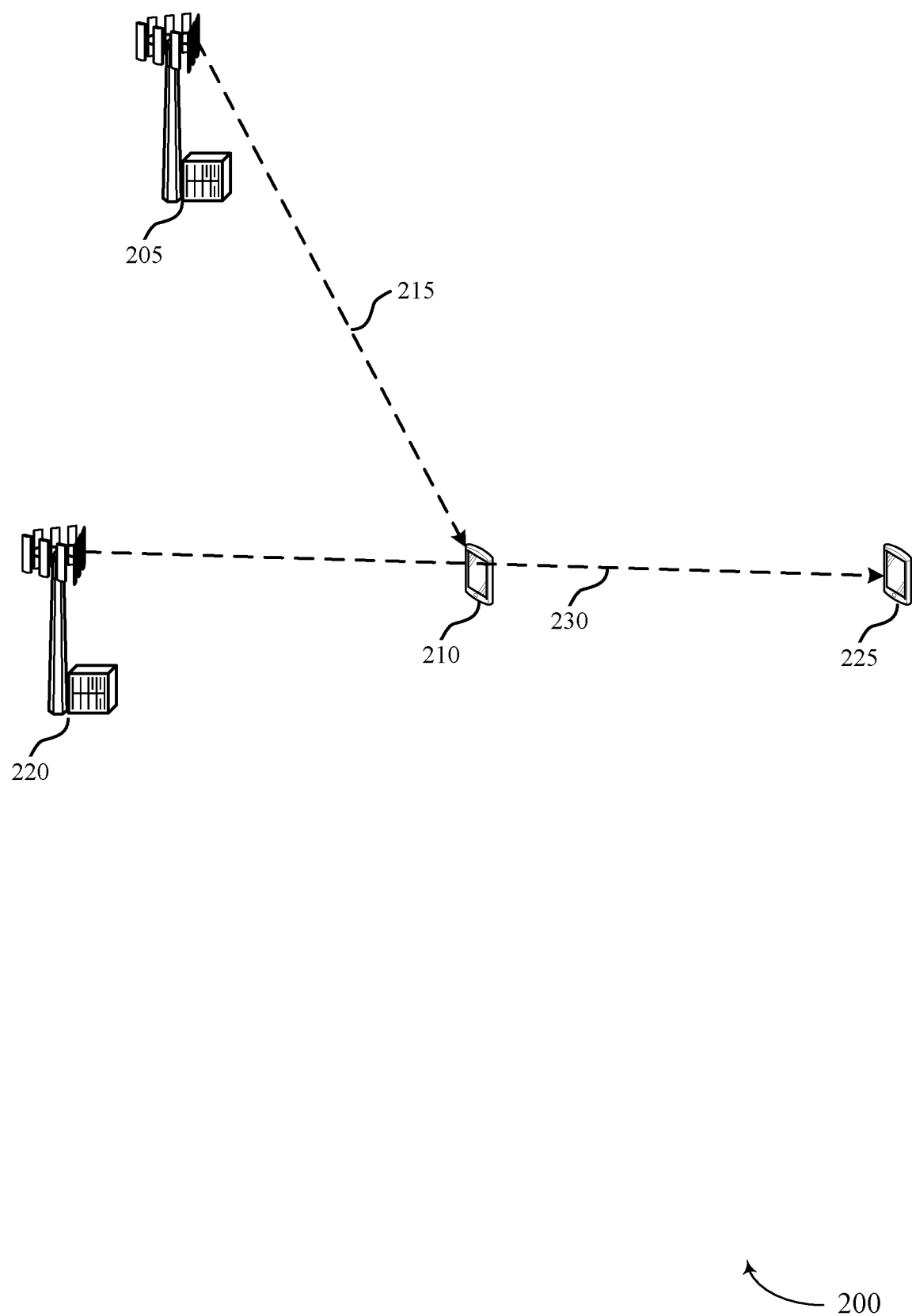
FIG. 2 illustrates an example of a wireless communications system that supports LAT procedures in accordance with aspects of the present disclosure.

FIG. 2 illustrates an example of a wireless communications system 200 that supports LAT procedures in accordance with various aspects of the present disclosure. In some examples, the wireless communications system 200 may implement aspects of wireless communications system 100.

The wireless communications system 200 may include a first wireless device 205, which may be an example of aspects of a base station 105 as described with reference to FIG. 1. In some other examples, the first wireless device 205 may be an example of aspects of a UE 115 as described with reference to FIG. 1. The wireless communications system 200 may also include a second wireless device 210, which may be an example of aspects of a UE 115 as described with reference to FIG. 1. In some other examples, the second wireless device 210 may be an example of aspects of a base station 105 as described with reference to FIG. 1. The first wireless device 205 and the second wireless device 210 may be members of a first wireless cell associated with a first PCI.

The first wireless device 205 may send wireless transmissions to the second wireless device 210 over a first communication path 215. A first wireless transmission may include a first preamble and a first data portion. The first preamble may include an identification of resources for a first interference avoidance request. The first preamble may also include an indication of the first PCI. The first wireless transmission may be transmitted over a first set of resource blocks.

The wireless communications system 200 may also include a third wireless device 220, which may be an example of aspects of a base station 105 as described with reference to FIG. 1, and a fourth wireless device 225, which may be an example of aspects of a UE 115 as described with reference to FIG. 1. In some other examples, the third wireless device 220 may be an example of aspects of a UE 115 and/or the fourth wireless device 225 may be an example of aspects of a base station 105, as described with reference to FIG. 1. In some examples, the third wireless device 220 and the fourth wireless device 225 may be members of a second wireless cell associated with a second PCI.

The third wireless device 220 may send wireless transmissions to the fourth wireless device 225 over a second communication path 230. For example, the third wireless device 220 may send a second wireless transmission without performing an LBT procedure. The second wireless transmission may include a second preamble and a second data portion. The second preamble may include an identification of resources for a second interference avoidance request. The second preamble may also include an indication of the second PCI. The second wireless transmission may be transmitted over a second set of resource blocks that overlaps with or includes the first set of resource blocks.

The second wireless transmission may not be addressed to the second wireless device 210, but may interfere with the receipt of the first wireless transmission because the second wireless device 210 is in the second communication path 230. When the second wireless device 210 detects interference from the second wireless transmission, the second wireless device 210 may transmit a complaint, for example, a second interference avoidance request, to the third wireless device 220. The second wireless device 210 may transmit the second interference avoidance request to the third wireless device 220 using the resources identified in the second preamble. In some examples, the second interference avoidance request may include the first PCI.

In some examples, the second wireless device 210 may also transmit a first interference avoidance request to the first wireless device 205 using the resources identified in the first preamble. In some examples, the first interference avoidance request may include the second PCI.

Upon receiving the second interference avoidance request, the third wireless device 220 may enable an interference avoidance mechanism to avoid causing interference with transmissions from the first wireless device 205. In some examples, enabling the interference avoidance mechanism may include triggering an LBT procedure. The LBT procedure may include sensing an energy level prior to transmitting on the wireless medium.

In some examples, enabling the interference avoidance mechanism may include implementing an FDM mechanism. In some examples, the third wireless device 220 may select a different set of resource blocks that does not overlap with the first set of resource blocks for transmitting to the fourth wireless device 225. For example, the third wireless device 220 may select a subset of the resource blocks used to transmit the second wireless transmission. In some other examples, the third wireless device 220 may select a set of resource blocks based on the first PCI and/or the second PCI. For example, the third wireless device 220 may select a set of resource blocks based on a mapping between available physical resource blocks (PRBs) and PCI modulo n, where n=2, 3, 4, or greater.

In some examples, enabling the interference avoidance mechanism may include implementing a TDM mechanism. In some examples, the third wireless device 220 may select a set of time resources that do not overlap with time resources assigned to the first wireless device 205. In some other examples, the third wireless device 220 may select a set of time resources based on the first PCI and/or the second PCI.

In some examples, enabling the interference avoidance mechanism may include implementing a spatial multiplexing mechanism. For instance, the use of spatially separate and distinct transmission paths may prevent interference on one or more devices. In some examples, the third wireless device 220 may transmit the second wireless transmission using one or more spatial layers from one or more different antennas via a spatial stream on a different spatial layer than may be assigned to the first wireless device 205. In some other examples, the third wireless device 220 may select a spatial layer for a spatial stream based on the first PCI and/or the second PCI.

In some examples, the first wireless device 205 may communicate with the second wireless device 210 to assign resource blocks and/or time slots. In some examples, the interference avoidance mechanisms may be specific to a wireless protocol (e.g., specific to New Radio (NR) transmissions). In some examples, the selection of PCIs for each cell may change over time (e.g., a self-organizing network (SON)-based slow selection may be used).

In some examples, the first wireless device 205 and/or the third wireless device 220 may enable the interference avoidance mechanism for a first period of time and may disable the interference avoidance mechanism after the first period of time. The first period of time may be, for example, between about 1 millisecond and about 1 second, or between about 100 millisecond and about 1 second. The term "about," as used herein, refers to a value within 10% of the stated value.

Figure 3:
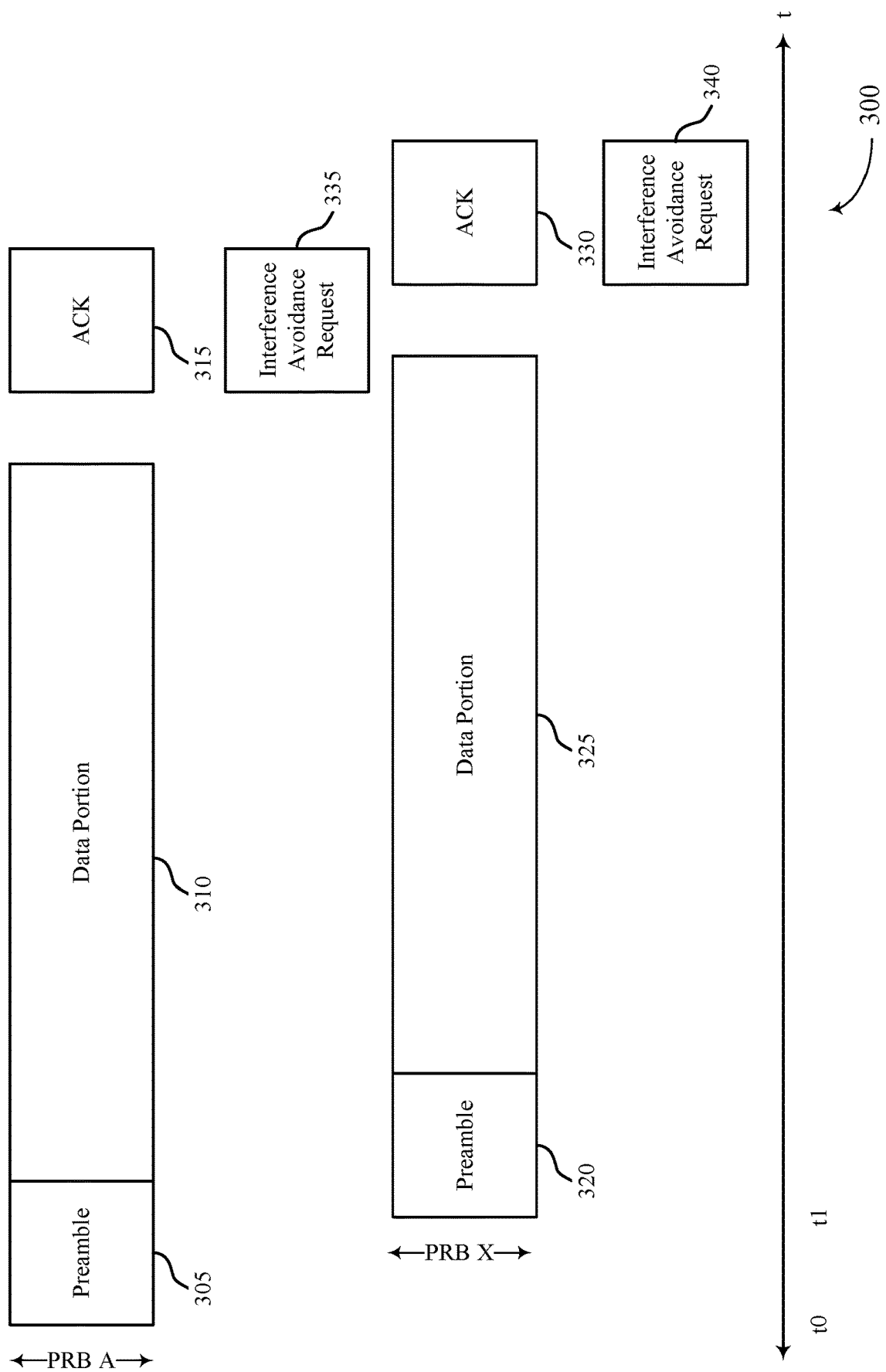
FIG. 3 illustrates an example of a communications flow in a wireless communications system that supports LAT procedures in accordance with aspects of the present disclosure.

FIG. 3 illustrates an example of a communications flow 300 in a wireless communications system that supports LAT procedures in accordance with various aspects of the present disclosure. In some examples, the wireless communications system may implement aspects of wireless communications system 100 and/or wireless communications system 200.

The communications flow 300 may show communications involving a victim transmitter, a victim receiver, and a jamming transmitter. The victim transmitter, victim receiver, and jamming transmitter may be examples of aspects of the wireless device 205, the wireless device 210, and the wireless device 220, respectively, as described with reference to FIG. 2.

At time t0, the victim transmitter may send a first wireless transmission to the victim receiver. The first wireless transmission may include a preamble 305 and a data portion 310. In some examples, the victim transmitter may send the preamble 305 and the data portion 310 using a first set of resource blocks (denoted PRB A). The victim receiver may respond with an acknowledgement (ACK) 315.

The preamble may include an indication of resources on which the victim transmitter may listen for feedback. For example, the preamble 305 may identify a combination of a time resource and a frequency resource for a complaint channel. The victim transmitter may listen for feedback on the complaint channel on, for example, assigned time and frequency resources. In some examples, the preamble 305 may indicate a PCI associated with the victim transmitter.

At time t1 (after time t0), the jamming transmitter may send a second wireless transmission. The second wireless transmission may be addressed to the victim receiver or may be addressed to another receiver but cause interference at the victim receiver. The second wireless transmission may include a preamble 320 and a data portion 325. The intended recipient (e.g., another wireless device in the wireless communications system) may respond with an ACK 330.

The preamble 320 of the second wireless transmission may include an indication of resources on which the jamming transmitter may listen for feedback. For example, the preamble 320 of the second wireless transmission may identify a combination of a time resource and a frequency resource for a second complaint channel. The preamble 320 of the second wireless transmission may indicate a second PCI associated with the jamming transmitter.

In some examples, the jamming transmitter may send the preamble 320 and data portion 325 of the second wireless transmission using a second set of resource blocks (denoted PRB X). The second set of resource blocks may overlap with the first set of resource blocks. For example, the second set of resource blocks may include the first set of resource blocks and additional resource blocks (e.g., PRB X may include PRB A, PRB B, and PRB C). As another example, the second set of resource blocks may include at least one of the resource blocks in the first set of resource blocks. The victim receiver may determine that the second wireless transmission by the jamming transmitter interferes with the first wireless transmission by the victim transmitter.

In some examples, the victim receiver may report the interference to the victim transmitter. For example, the victim receiver may transmit a first interference avoidance request 335 to the victim transmitter using the resources identified in the preamble 305 of the first wireless transmission. In some examples, the first interference avoidance request 335 may include an indication of the second PCI associated with the jamming transmitter (e.g., the second PCI identified in the preamble 320 of the second wireless transmission).

The victim receiver may report the interference to the jamming transmitter. For example, the victim receiver may transmit a second interference avoidance request 340 to the jamming transmitter using the resources identified in the preamble 320 of the second wireless transmission. In some examples, the second interference avoidance request 340 may include an indication of the first PCI associated with the victim transmitter (e.g., the first PCI identified in the preamble 305 of the first wireless transmission).

In response to receiving the second interference avoidance request 340, the jamming transmitter may enable an interference avoidance mechanism. In some examples, the victim transmitter may also enable an interference avoidance mechanism in response to receiving the first interference avoidance request 335. The interference avoidance mechanism may be, for example, an FDM mechanism, a TDM mechanism, and/or a spatial multiplexing mechanism. In some examples, the mechanism may be PCI dependent. The interference avoidance mechanism may be enabled for a first period of time, and then disabled following the first period of time. The first period of time may be, for example, between about 1 millisecond and about 1 second, or between about 100 milliseconds and about 1 second. In some examples, the first period of time may vary based on a channel condition or a traffic condition. In some examples, the interference avoidance mechanism may be an LBT procedure.

Figure 4:
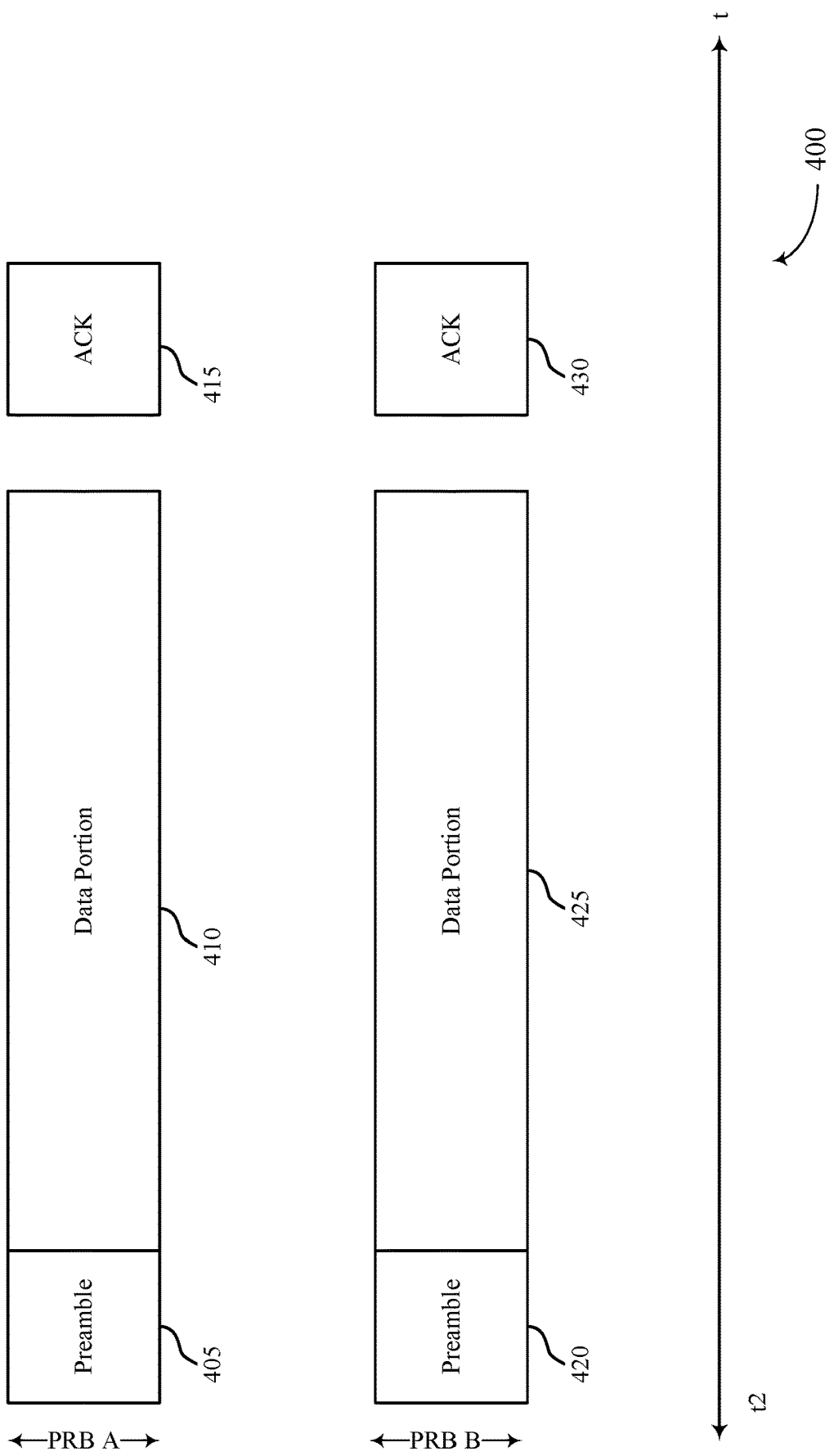
FIG. 4 illustrates an example of a communications flow in a wireless communications system that supports LAT procedures in accordance with aspects of the present disclosure.

FIG. 4 illustrates an example of a communications flow 400 in a wireless communications system that supports LAT procedures in accordance with various aspects of the present disclosure. In some examples, the wireless communications system may implement aspects of wireless communications system 100 or wireless communications system 200.

The communications flow 400 shows communications after the jamming transmitter has enabled an interference avoidance mechanism in response to receiving an interference avoidance request, such as the second interference avoidance request 340 described with reference to FIG. 3.

The victim transceiver may transmit a first wireless transmission to the victim receiver at time t2. The first wireless transmission may include a first preamble 405 and a first data portion 410. In some examples, the first data portion 410 may be a retransmission of the data portion 310 of the first wireless transmission as described with reference to FIG. 3. The first preamble 405 may be an example of aspects of the preamble 305 of the first wireless transmission as described with reference to FIG. 3. The first wireless transmission may be transmitted using a first set of resource blocks (denoted PRB A). In this example, the first set of resource blocks may be the same resource blocks used to transmit the first wireless transmission in FIG. 3. In some other examples, the victim transmitter may select a different set of resource blocks in response to receiving an interference avoidance request, such as the first interference avoidance request 335 as described with reference to FIG. 3.

The jamming transmitter may also transmit a second wireless transmission at time t2. The second wireless transmission may include a second preamble 420 and a second data portion 425. The second preamble 420 may be an example of aspects of the preamble 320 of the second wireless transmission as described with reference to FIG. 3. In some examples, the second data portion 425 may be a retransmission of the data portion 325 of the second wireless transmission as described with reference to FIG. 3.

The jamming transmitter may transmit the second wireless transmission on a second set of resource blocks (denoted PRB B). The second set of resource blocks may not include any of the resource blocks in the first set of resource blocks. In some examples, the second set of resource blocks may be a subset of the set of resource blocks used to transmit the second wireless transmission in FIG. 3. The jamming transmitter may select the second set of resource blocks in response to receiving an interference avoidance request such as second interference avoidance request 340 as described with reference to FIG. 3.

In some examples, the set of resource blocks may be selected based on a PCI associated with a serving base station 105 for each transmitter. For example, the victim transmitter may be or may be associated with a first base station 105 having a first PCI, and the jamming transmitter may be or may be associated with a second base station 105 having a second PCI. The PRBs may be assigned by mapping between available PRBs and PCI modulo n, where n may be 2, 3, 4, or greater.

In some other examples, enabling the interference avoidance mechanism may include triggering an LBT procedure such as an energy detection LBT procedure, a preamble based LBT procedure, or another LBT procedure. For example, the victim transmitter and/or the jamming transmitter may select thresholds for energy detection and/or preamble detection to use during a channel access procedure. In some examples, the channel access procedure may include performing energy detection over N contention slots (countdown from N to 0).

In some other examples, enabling the interference avoidance mechanism may include implementing a PCI-dependent TDM mechanism. For example, time resources may be divided between two or more wireless cells. The jamming transmitter and the victim transmitter may then transmit on the same or overlapping frequency resources during different time slots. For example, the victim transmitter may transmit on PRB A and the jamming transmitter may transmit on PRB X, without causing interference at the victim receiver.

Figure 5:
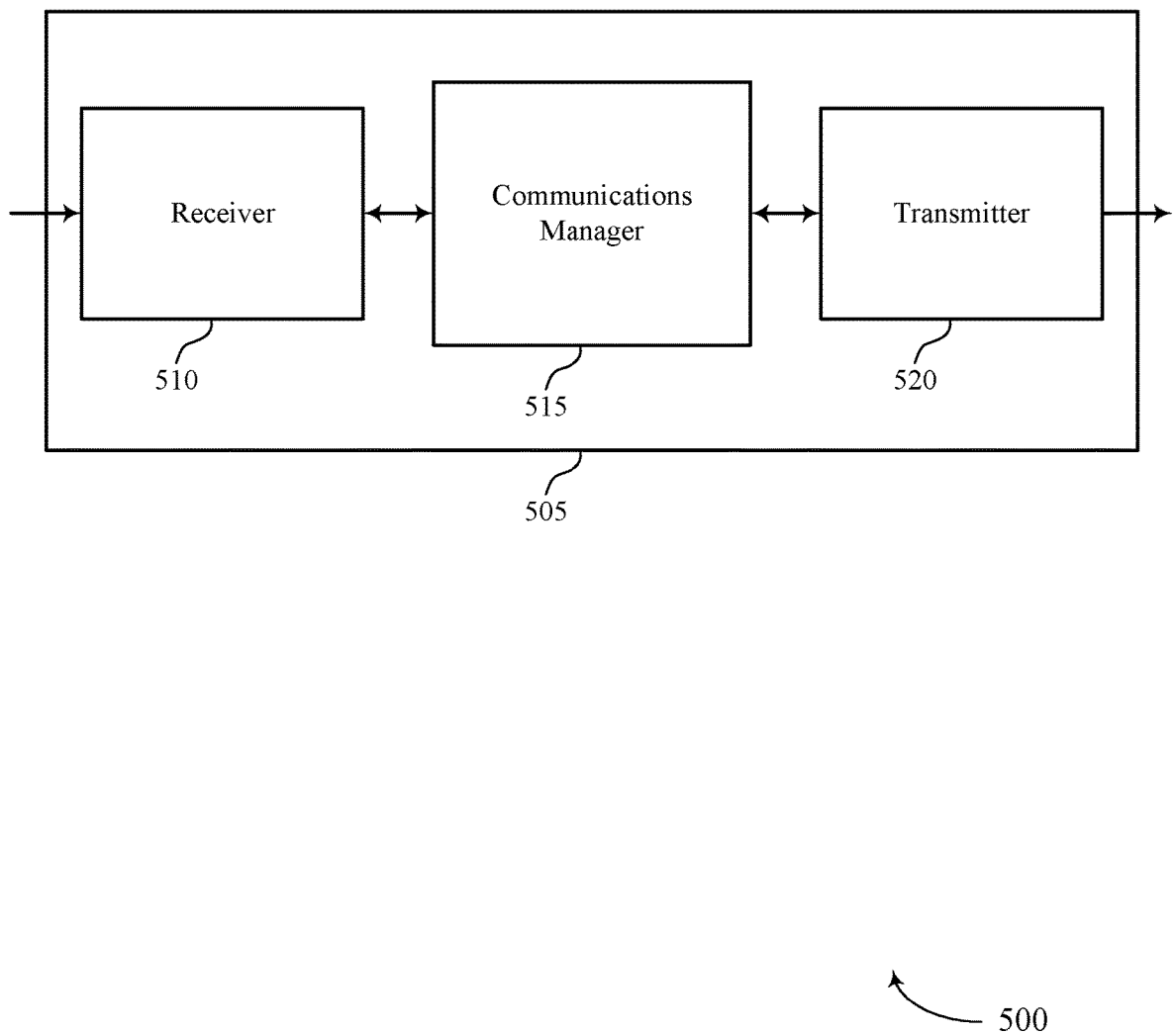
FIG. 5 shows a block diagram of a wireless device that supports LAT procedures in accordance with a first aspect of the present disclosure.

FIG. 5 shows a block diagram 500 of a wireless device 505 that supports LAT procedures in accordance with aspects of the present disclosure. The wireless device 505 may be an example of aspects of a wireless device 205, 210, or 215 as described herein. The wireless device 505 may include a receiver 510, a communications manager 515, and a transmitter 520. The wireless device 505 may also include a processor. Each of these components may be in communication with one another (e.g., via one or more buses).

The receiver 510 may receive information such as packets, user data, or control information associated with various information channels (e.g., control channels, data channels, and information related to LAT procedure, etc.). Information may be passed on to other components of the device. The receiver 510 may be an example of aspects of the transceiver 835 described with reference to FIG. 8. The receiver 510 may utilize a single antenna or a set of antennas.

The communications manager 515 may be an example of aspects of the communications manager 815 described with reference to FIG. 8. The communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, the communications manager 515 and/or at least some of its various sub-components may be a separate and distinct component in accordance with various aspects of the present disclosure. In other examples, the communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The communications manager 515 may perform, by a first wireless device, a wireless transmission to a second wireless device, the wireless transmission including a data portion and a preamble over a channel of a radio frequency spectrum band and the preamble including an indication of resources for an interference avoidance request corresponding to the wireless transmission. The communications manager 515 may also receive, from a first wireless device, a first wireless transmission at a second wireless device over a channel of a radio frequency spectrum band, a preamble of the first wireless transmission including an indication of resources for an interference avoidance request corresponding to the first wireless transmission, detect interference by the first wireless transmission with a second wireless transmission from a third wireless device, and transmit the interference avoidance request to the first wireless device on the indicated resources based on the detected interference. The communications manager 515 may receive the interference avoidance request from a third wireless device on the indicated resources and enable an interference avoidance mechanism for a subsequent transmission to the second wireless device based on the received interference avoidance request. In some cases, subsequent wireless transmissions from the second wireless device may be received on a second frequency band, the second frequency band being different than the first frequency band.

The transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
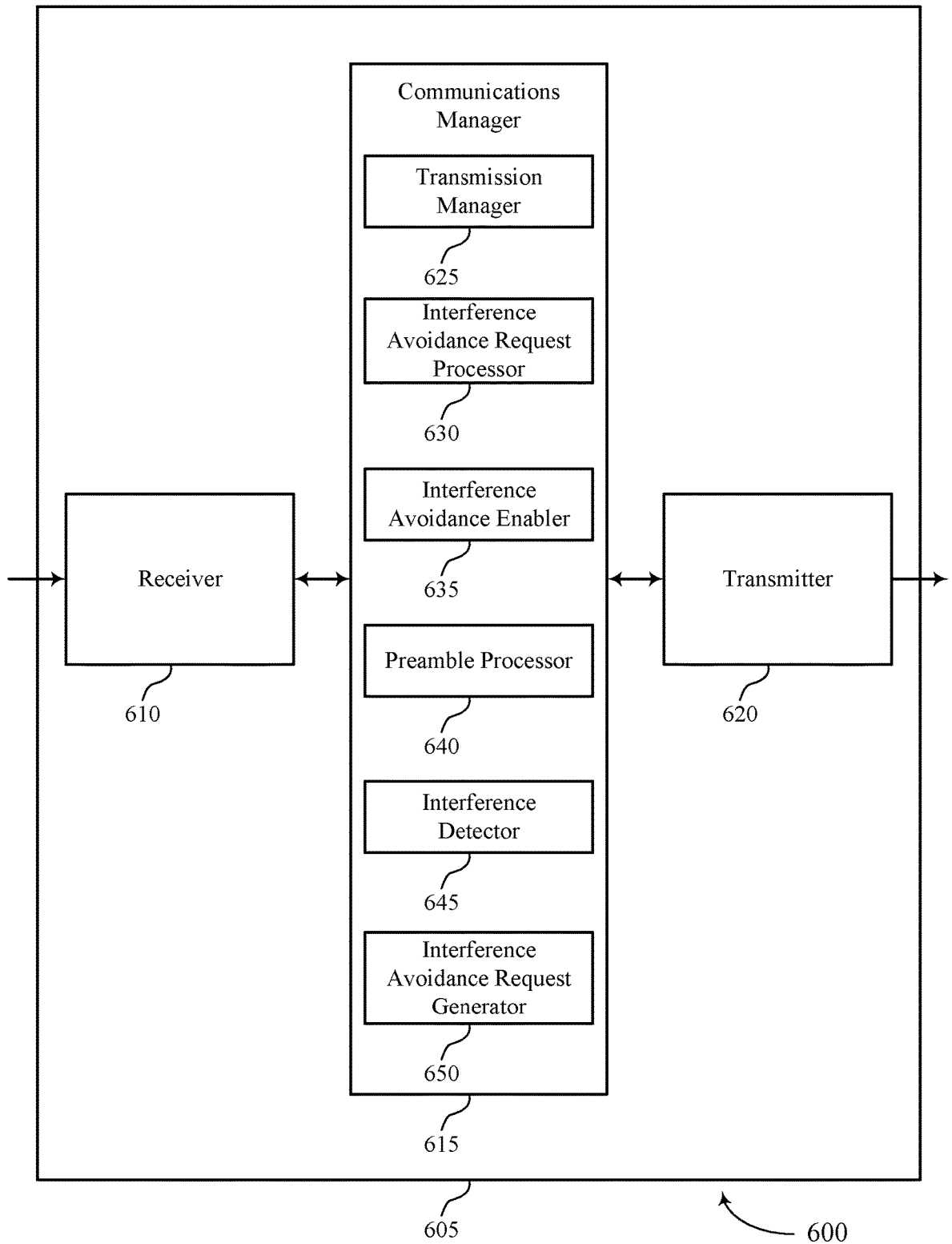
FIG. 6 shows a block diagram of a wireless device that supports LAT procedures in accordance with aspects of the present disclosure, providing additional details regarding a communications manager component.

FIG. 6 shows a block diagram 600 of a wireless device 605 that supports LAT procedures in accordance with aspects of the present disclosure. The wireless device 605 may be an example of aspects of a wireless device 505 or a wireless device 205, 210, or 215 as described with reference to FIGS. 2 and 5. The wireless device 605 may include a receiver 610, a communications manager 615, and a transmitter 620. The wireless device 605 may also include a processor. Each of these components may be in communication with one another (e.g., via one or more buses).

The receiver 610 may receive information such as packets, user data, or control information associated with various information channels (e.g., control channels, data channels, and information related to LAT procedures, etc.). Information may be passed on to other components of the device. The receiver 610 may be an example of aspects of the transceiver 835 described with reference to FIG. 8. The receiver 610 may utilize a single antenna or a set of antennas.

The communications manager 615 may be an example of aspects of the communications manager 815 described with reference to FIG. 8. The communications manager 615 may include a transmission manager 625, an interference avoidance request processor 630, an interference avoidance enabler 635, a preamble processor 640, an interference detector 645, and an interference avoidance request generator 650.

The transmission manager 625 may perform, by a first wireless device, a wireless transmission to a second wireless device, the wireless transmission including a data portion and a preamble over a channel of a radio frequency spectrum band, and the preamble including an indication of resources for an interference avoidance request corresponding to the wireless transmission. In some cases, the preamble further includes a PCI associated with the first wireless device. In some cases, the wireless transmission is transmitted on a first frequency band.

The interference avoidance request processor 630 may receive the interference avoidance request from a third wireless device on the indicated resources and receive the PCI of the third wireless device in a preamble of the interference avoidance request.

The interference avoidance enabler 635 may enable a wireless interference avoidance mechanism at the first wireless device based on the interference avoidance request. In some cases, enabling the interference avoidance mechanism may include implementing the interference avoidance mechanism based on one or more of: a PCI associated with the first wireless device, a PCI associated with the third wireless device, or a combination thereof. In some cases, enabling the interference avoidance mechanism may include performing an LBT procedure on the channel prior to performing a subsequent transmission over the channel. In some cases, enabling the interference avoidance mechanism may include applying one or more of: an FDM scheme, a TDM scheme, a spatial multiplexing scheme, or a combination thereof, to the subsequent transmission over the channel based on the received interference avoidance request. In some cases, enabling the interference avoidance mechanism may include implementing the interference avoidance mechanism for a first period of time. In some cases, the first period of time is between about 1 millisecond and about 1 second or between about 100 milliseconds and about 1 second. In some cases, the first period of time varies based on one of a channel condition or a traffic condition. The interference avoidance enabler 635 may enable an interference avoidance mechanism for a subsequent transmission to the second wireless device based on the received interference avoidance request, where enabling the interference avoidance mechanism may include transmitting one or more additional wireless transmissions to a receiver on a second frequency band, the second frequency band being different than the first frequency band.

The preamble processor 640 may receive, from a first wireless device, a first wireless transmission at a second wireless device over a channel of a radio frequency spectrum band, a preamble of the first wireless transmission including an indication of resources for an interference avoidance request corresponding to the first wireless transmission. In some cases, the preamble includes a first PCI associated with the first wireless device. In some cases, the first wireless transmission is received on a first frequency band.

The interference detector 645 may detect interference by the first wireless transmission with a second wireless transmission from a third wireless device. In some cases, the second wireless transmission includes a second preamble including an indication of second resources for a second interference avoidance request corresponding to the second wireless transmission.

The interference avoidance request generator 650 may transmit the interference avoidance request to the first wireless device on the indicated resources based on the detected interference, transmit a PCI of the third wireless device in a preamble of the interference avoidance request, transmit the second interference avoidance request on the indicated second resources, and transmit an indication of the first PCI to the third wireless device. In some cases, the interference avoidance request includes an indication of a second PCI associated with the third wireless device.

The transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
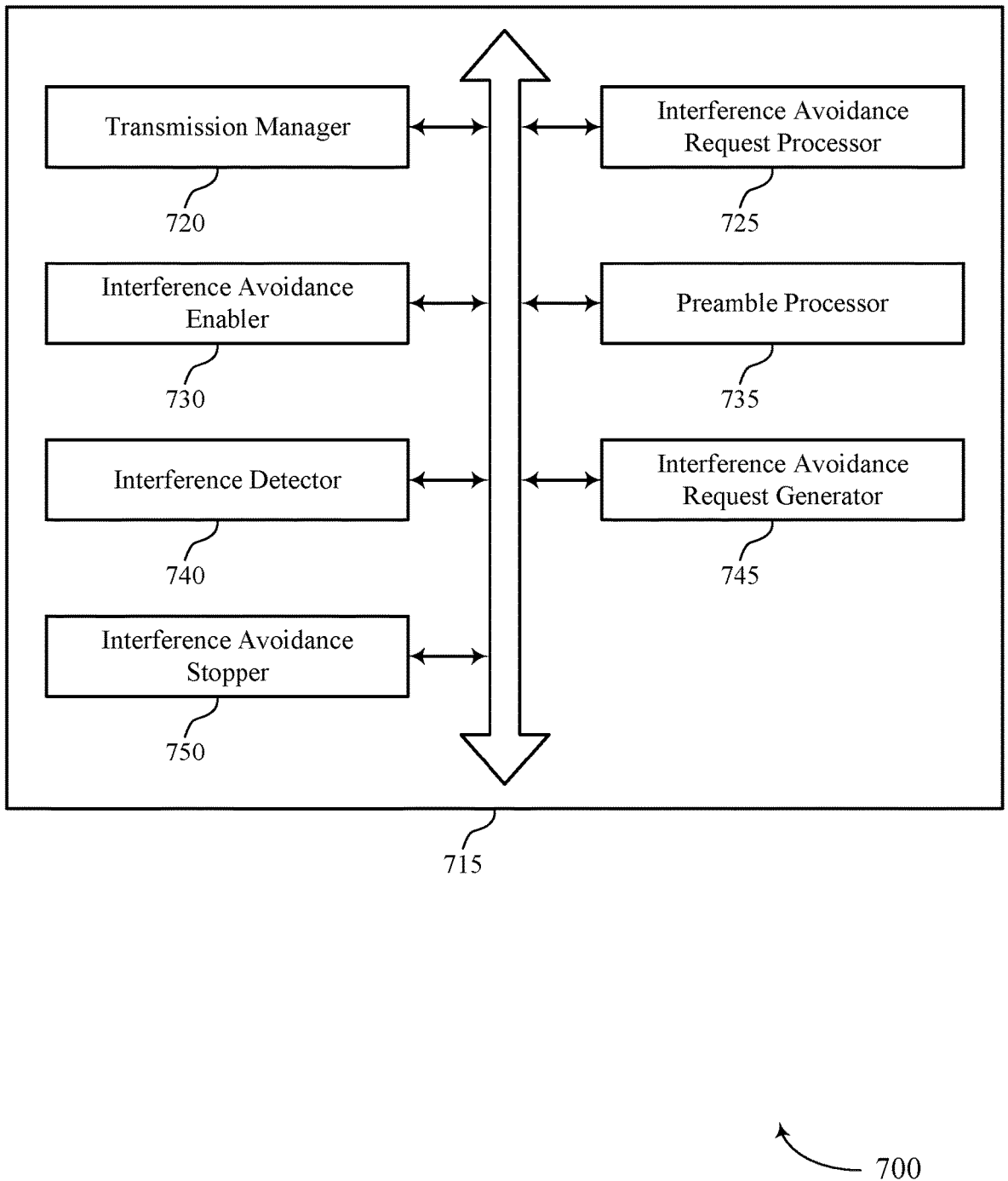
FIG. 7 shows a block diagram of a communications manager component of a wireless device that supports LAT procedures in accordance with aspects of the present disclosure.

FIG. 7 shows a block diagram 700 of a communications manager 715 that supports LAT procedures in accordance with aspects of the present disclosure. The communications manager 715 may be an example of aspects of a communications manager 515, a communications manager 615, or a communications manager 815 described with reference to FIGS. 5, 6, and 8. The communications manager 715 may include a transmission manager 720, an interference avoidance request processor 725, an interference avoidance enabler 730, a preamble processor 735, an interference detector 740, an interference avoidance request generator 745, and an interference avoidance stopper 750. Each of these modules may communicate, directly or indirectly, with one another (e.g., via one or more buses).

The transmission manager 720 may perform, by a first wireless device, a wireless transmission to a second wireless device, the wireless transmission including a data portion and a preamble over a channel of a radio frequency spectrum band and the preamble including an indication of resources for an interference avoidance request corresponding to the wireless transmission. In some cases, the preamble further includes a PCI associated with the first wireless device. In some cases, the wireless transmission (e.g., a data transmission) is transmitted on a first frequency band.

The interference avoidance request processor 725 may receive the interference avoidance request from a third wireless device on the indicated resources and receive the PCI of the third wireless device in a preamble of the interference avoidance request.

The interference avoidance enabler 730 may enable a wireless interference avoidance mechanism at the first wireless device based on the interference avoidance request. In some cases, enabling the interference avoidance mechanism may include implementing the interference avoidance mechanism based on one or more of: a PCI associated with the first wireless device, a PCI associated with the third wireless device, or a combination thereof. In some cases, enabling the interference avoidance mechanism may include performing an LBT procedure on the channel prior to performing the subsequent transmission over the channel. In some cases, enabling the interference avoidance mechanism may include applying one or more of: an FDM scheme, a TDM scheme, a spatial multiplexing scheme, or a combination thereof, to the subsequent transmission over the channel based on the received interference avoidance request. In some cases, enabling the interference avoidance mechanism may include implementing the interference avoidance mechanism for a first period of time. In some cases, the first period of time is between about 1 millisecond and about 1 second, or between about 100 milliseconds and about 1 second. In some cases, the first period of time varies based on one of a channel condition or a traffic condition.

The interference avoidance enabler 730 may enable an interference avoidance mechanism for a subsequent transmission to the second wireless device based on the received interference avoidance request, where enabling the interference avoidance mechanism may include transmitting one or more additional wireless transmissions to a receiver on a second frequency band, the second frequency band being different than the first frequency band.

The preamble processor 735 may receive, from a first wireless device, a first wireless transmission at a second wireless device over a channel of a radio frequency spectrum band, a preamble of the first wireless transmission including an indication of resources for an interference avoidance request corresponding to the first wireless transmission. In some cases, the preamble includes a first PCI associated with the first wireless device. In some cases, the first wireless transmission is received on a first frequency band.

The interference detector 740 may detect interference by the first wireless transmission with a second wireless transmission from a third wireless device. In some cases, the second wireless transmission includes a second preamble including an indication of second resources for a second interference avoidance request corresponding to the second wireless transmission.

The interference avoidance request generator 745 may transmit the interference avoidance request to the first wireless device on the indicated resources based on the detected interference, transmit a PCI of the third wireless device in a preamble of the interference avoidance request, transmit the second interference avoidance request on the indicated second resources, and transmit an indication of the first PCI to the third wireless device. In some cases, the interference avoidance request includes an indication of a second PCI associated with the third wireless device. The interference avoidance stopper 750 may stop the implementation of the interference avoidance mechanism after the first period of time.

Figure 8:
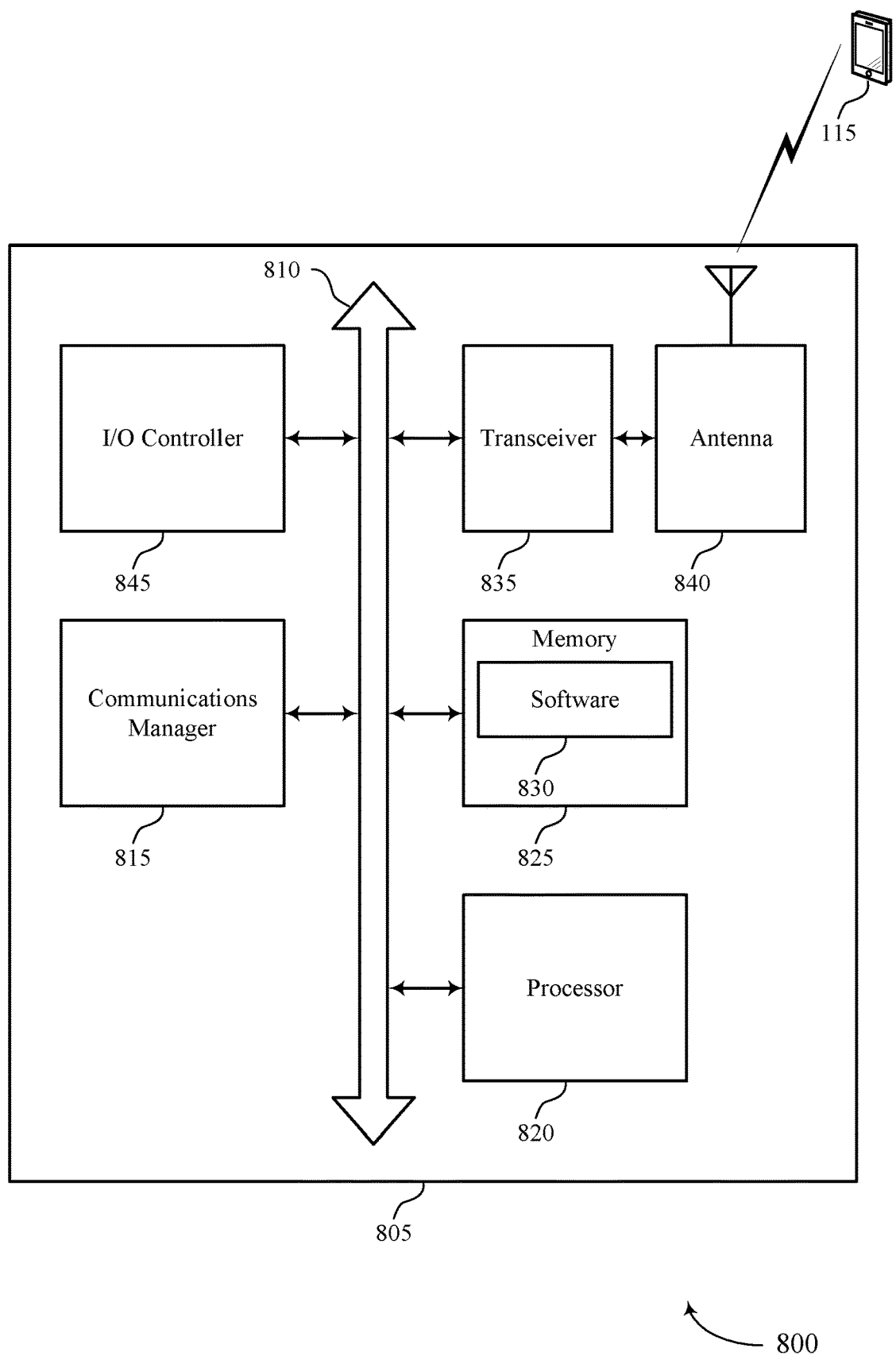
FIG. 8 illustrates a block diagram of a system including a wireless device that supports LAT procedures in accordance with aspects of the present disclosure.

FIG. 8 shows a diagram of a system 800 including a device 805 that supports LAT procedures in accordance with aspects of the present disclosure. The device 805 may be an example of or include the components of a wireless device 505, a wireless device 605, or a wireless device 205, 210, or 215 as described herein, e.g., with reference to FIGS. 2, 5 and 6. The device 805 may include components for bi-directional voice and data communications including components for transmitting and receiving communications, including a communications manager 815, a processor 820, a memory 825, software 830, a transceiver 835, an antenna 840, and an I/O controller 845. These components may be in electronic communication via one or more buses (e.g., a bus 810).

The processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 820 may be configured to operate a memory array using a memory controller. In other cases, a memory controller may be integrated into the processor 820. The processor 820 may be configured to execute computer-readable instructions stored in a memory to perform various functions (e.g., functions or tasks supporting LAT procedures).

The memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The software 830 may include code to implement aspects of the present disclosure, including code to support LAT procedures. The software 830 may be stored in a non-transitory computer-readable medium such as system memory or other memory. In some cases, the software 830 may not be directly executable by the processor but may cause a computer (e.g., when compiled and executed) to perform functions described herein.

The transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

The I/O controller 845 may manage input and output signals for the device 805. The I/O controller 845 may also manage peripherals not integrated into the device 805. In some cases, the I/O controller 845 may represent a physical connection or port to an external peripheral. In some cases, the I/O controller 845 may utilize an operating system such as iOS®, ANDROID®, MS-DOS®, MS-WINDOWS®, OS/2®, UNIX®, LINUX®, or another known operating system. In other cases, the I/O controller 845 may represent or interact with a modem, a keyboard, a mouse, a touchscreen, or a similar device. In some cases, the I/O controller 845 may be implemented as part of a processor. In some cases, a user may interact with the device 805 via the I/O controller 845 or via hardware components controlled by the I/O controller 845.

Figure 9:
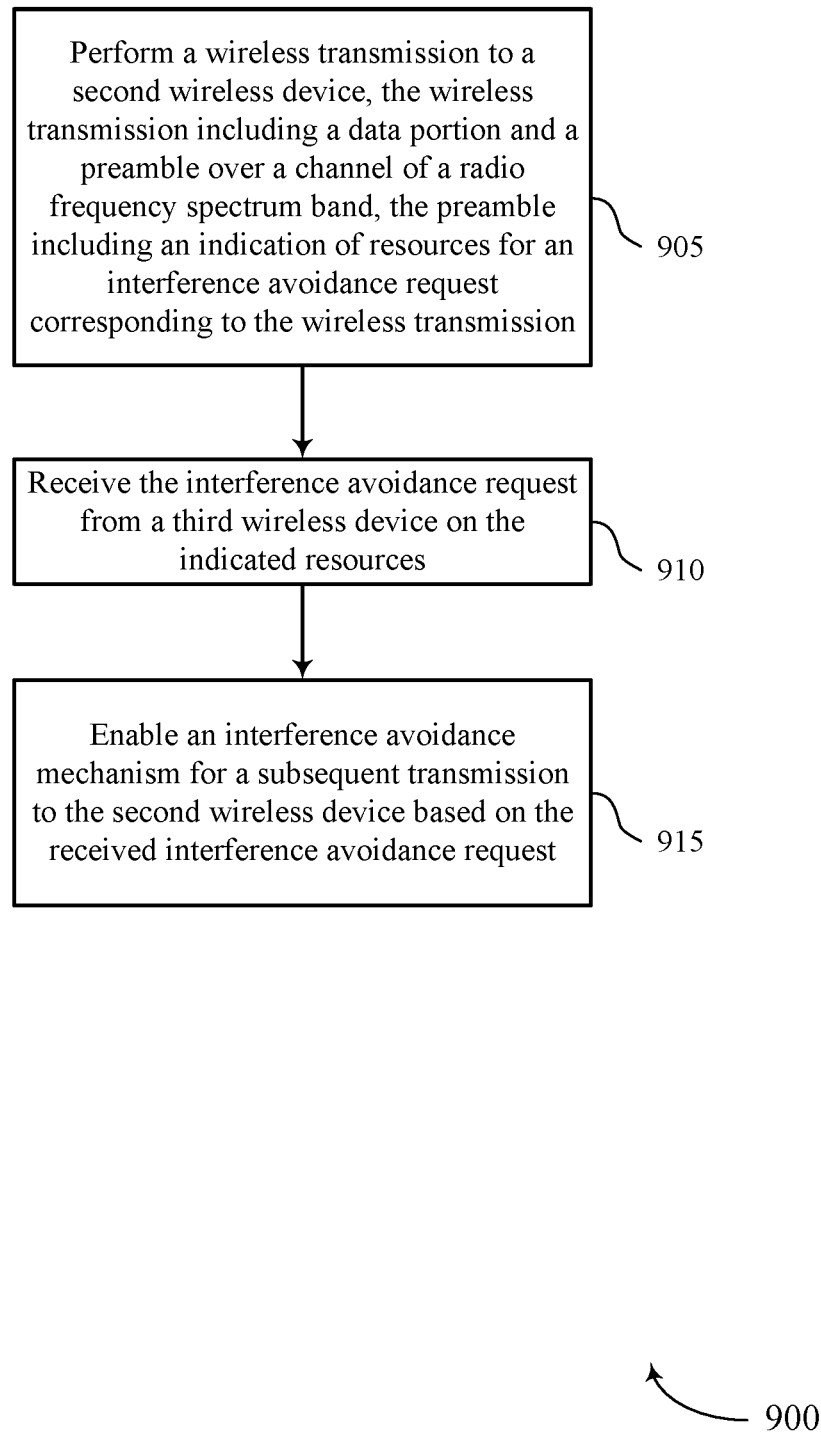
FIG. 9 illustrates a method at a wireless device for LAT procedures in accordance with a first aspect of the present disclosure.

FIG. 9 shows a flowchart illustrating a method 900 for an LAT procedure in accordance with aspects of the present disclosure. The operations of the method 900 may be implemented by a wireless device, such as a wireless device 205, 210, or 215 described with reference to FIG. 2, or its components as described herein. For example, the operations of the method 900 may be performed by a communications manager as described with reference to FIGS. 5 through 8. In some examples, the wireless device may execute a set of codes to control the functional elements of the wireless device to perform the functions described herein. Additionally or alternatively, the wireless device may perform aspects of the functions described herein using special-purpose hardware.

At 905 the wireless device may perform a wireless transmission to a second wireless device, the wireless transmission including a data portion and a preamble over a channel of a radio frequency spectrum band, the preamble including an indication of resources for an interference avoidance request corresponding to the wireless transmission. The operations of 905 may be performed according to the methods described herein. In certain examples, aspects of the operations of 905 may be performed by a transmission manager as described with reference to FIGS. 5 through 8.

At 910 the wireless device may receive the interference avoidance request from a third wireless device on the indicated resources. The operations of 910 may be performed according to the methods described herein. In certain examples, aspects of the operations of 910 may be performed by an interference avoidance request processor as described with reference to FIGS. 5 through 8.

At 915 the wireless device may enable an interference avoidance mechanism for a subsequent transmission to the second wireless device based on the received interference avoidance request. The operations of 915 may be performed according to the methods described herein. In certain examples, aspects of the operations of 915 may be performed by an interference avoidance enabler as described with reference to FIGS. 5 through 8.

Figure 10:
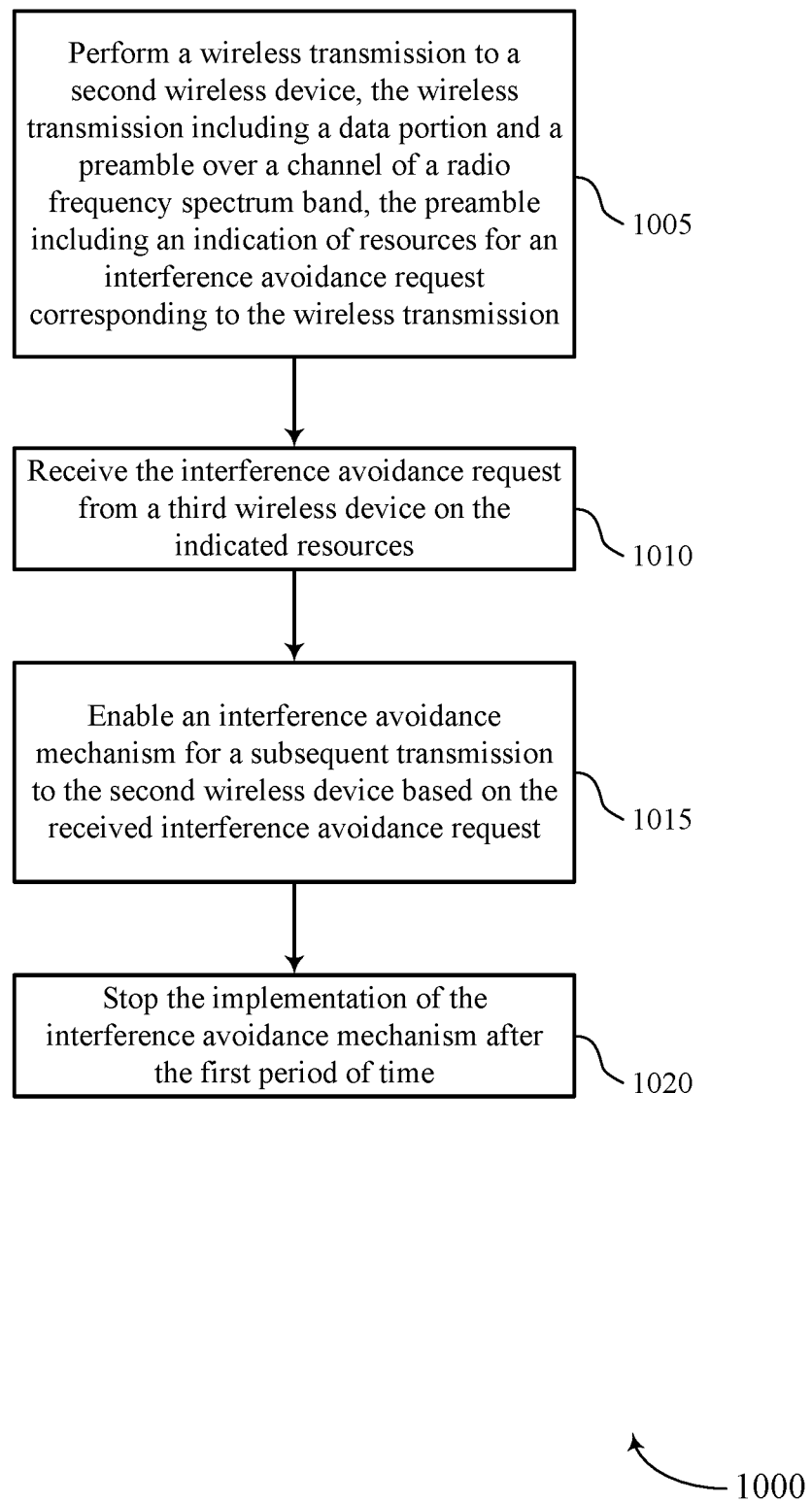
FIG. 10 illustrates a method at a wireless device for LAT procedures in accordance with a second aspect of the present disclosure.

FIG. 10 shows a flowchart illustrating a method 1000 for an LAT procedure in accordance with aspects of the present disclosure. The operations of the method 1000 may be implemented by a wireless device, such as a wireless device 205, 210, or 215 described with reference to FIG. 2, or its components as described herein. For example, the operations of the method 1000 may be performed by a communications manager as described with reference to FIGS. 5 through 8. In some examples, the wireless device may execute a set of codes to control the functional elements of the wireless device to perform the functions described herein. Additionally or alternatively, the wireless device may perform aspects of the functions described herein using special-purpose hardware.

At 1005 the wireless device may perform a wireless transmission to a second wireless device, the wireless transmission including a data portion and a preamble over a channel of a radio frequency spectrum band, the preamble including an indication of resources for an interference avoidance request corresponding to the wireless transmission. The operations of 1005 may be performed according to the methods described herein. In certain examples, aspects of the operations of 1005 may be performed by a transmission manager as described with reference to FIGS. 5 through 8.

At 1010 the wireless device may receive the interference avoidance request from a third wireless device on the indicated resources. The operations of 1010 may be performed according to the methods described herein. In certain examples, aspects of the operations of 1010 may be performed by an interference avoidance request processor as described with reference to FIGS. 5 through 8.

At 1015 the wireless device may enable an interference avoidance mechanism for a subsequent transmission to the second wireless device based on the received interference avoidance request. In some cases, enabling the interference avoidance mechanism may include implementing the interference avoidance mechanism for a first period of time. In some cases, the first period of time may be between about 1 millisecond and about 1 second, or between about 100 milliseconds and about 1 second, or some other period of time. The operations of 1015 may be performed according to the methods described herein. In certain examples, aspects of the operations of 1015 may be performed by an interference avoidance enabler as described with reference to FIGS. 5 through 8.

At 1020 the wireless device may stop the implementation of the interference avoidance mechanism after the first period of time. The operations of 1020 may be performed according to the methods described herein. In certain examples, aspects of the operations of 1020 may be performed by an interference avoidance stopper as described with reference to FIGS. 5 through 8.

Figure 11:
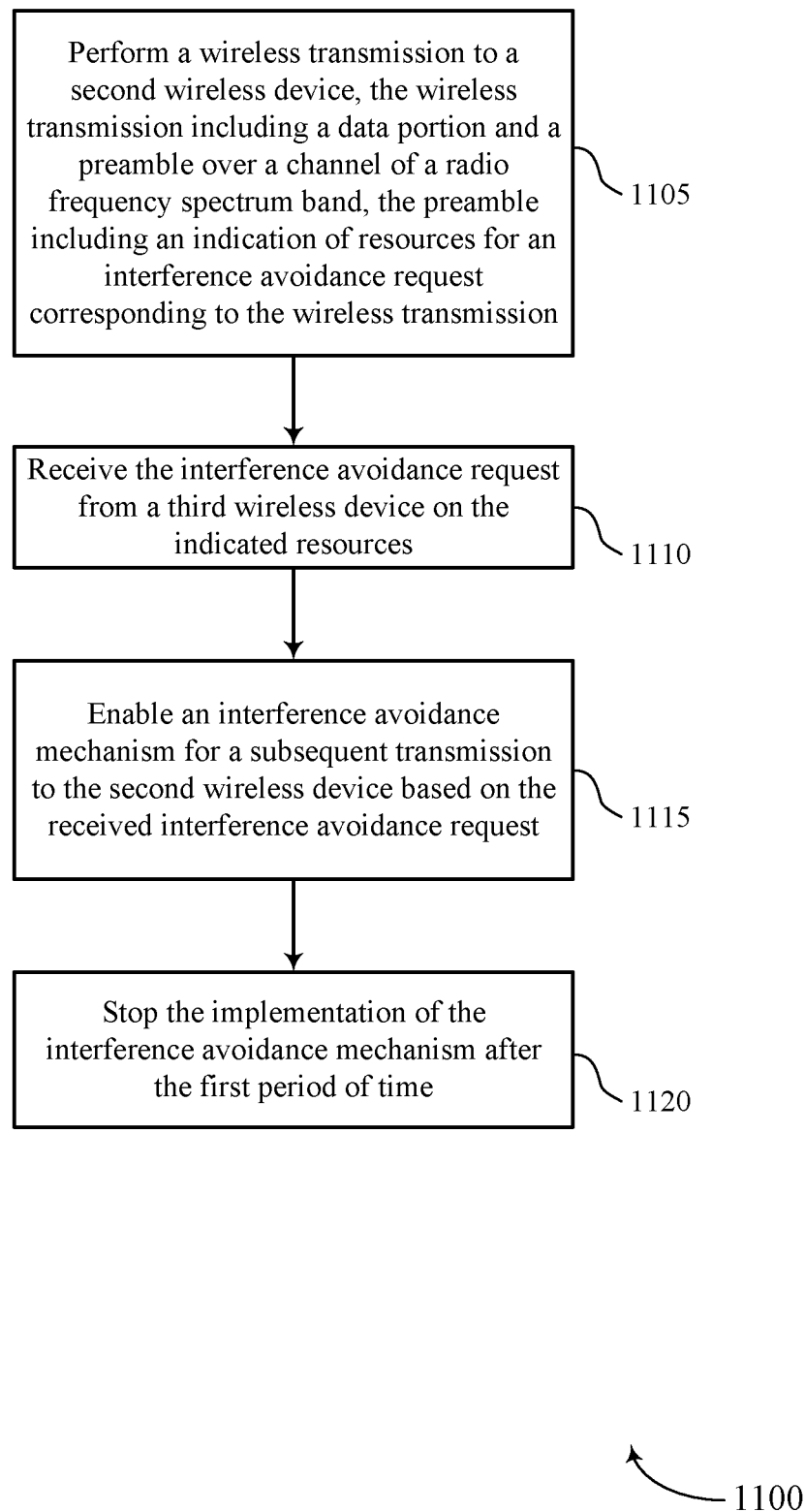
FIG. 11 illustrates a method at a wireless device for LAT procedures in accordance with a third aspect of the present disclosure.

FIG. 11 shows a flowchart illustrating a method 1100 for an LAT procedure in accordance with aspects of the present disclosure. The operations of the method 1100 may be implemented by a wireless device, such as a wireless device 205, 210, or 215 described with reference to FIG. 2, or its components as described herein. For example, the operations of the method 1100 may be performed by a communications manager as described with reference to FIGS. 5 through 8. In some examples, the wireless device may execute a set of codes to control the functional elements of the wireless device to perform the functions described herein. Additionally or alternatively, the wireless device may perform aspects of the functions described herein using special-purpose hardware.

At 1105 the wireless device may perform a wireless transmission to a second wireless device, the wireless transmission including a data portion and a preamble over a channel of a radio frequency spectrum band, the preamble including an indication of resources for an interference avoidance request corresponding to the wireless transmission. The operations of 1105 may be performed according to the methods described herein. In certain examples, aspects of the operations of 1105 may be performed by a transmission manager as described with reference to FIGS. 5 through 8.

At 1110 the wireless device may receive the interference avoidance request from a third wireless device on the indicated resources. The operations of 1110 may be performed according to the methods described herein. In certain examples, aspects of the operations of 1110 may be performed by an interference avoidance request processor as described with reference to FIGS. 5 through 8.

At 1115 the wireless device may enable an interference avoidance mechanism for a subsequent transmission to the second wireless device based on the received interference avoidance request. In some cases, enabling the interference avoidance mechanism may include implementing the interference avoidance mechanism for a first period of time. In some cases, the first period of time varies based on one of a channel condition or a traffic condition. The operations of 1115 may be performed according to the methods described herein. In certain examples, aspects of the operations of 1115 may be performed by an interference avoidance enabler as described with reference to FIGS. 5 through 8.

At 1120 the wireless device may stop the implementation of the interference avoidance mechanism after the first period of time. The operations of 1120 may be performed according to the methods described herein. In certain examples, aspects of the operations of 1120 may be performed by an interference avoidance stopper as described with reference to FIGS. 5 through 8.

Figure 12:
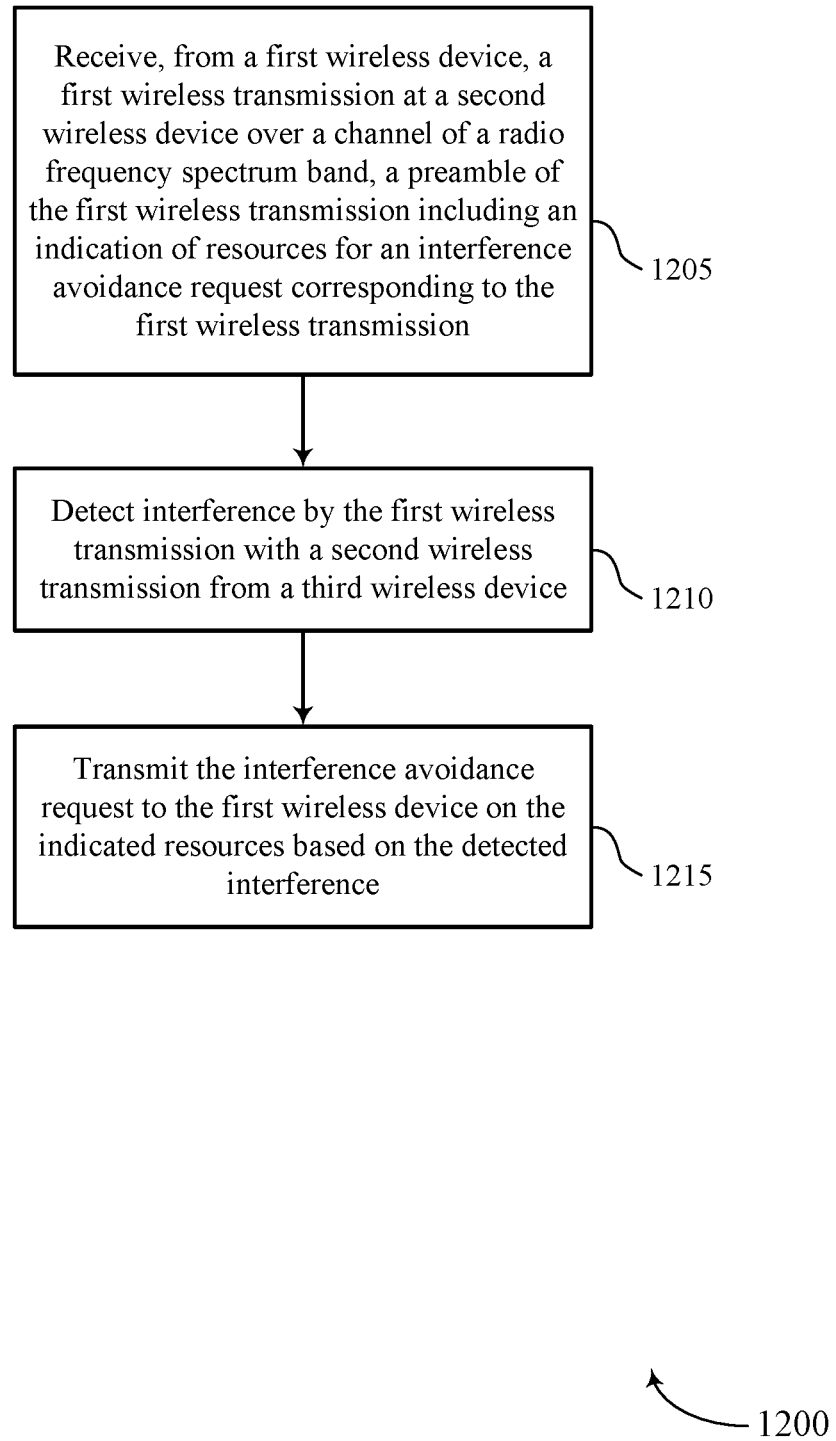
FIG. 12 illustrates a method at a wireless device for LAT procedures in accordance with a fourth aspect of the present disclosure.

FIG. 12 shows a flowchart illustrating a method 1200 for an LAT procedure in accordance with aspects of the present disclosure. The operations of the method 1200 may be implemented by a wireless device, such as a wireless device 205, 210, or 215 described with reference to FIG. 2, or its components as described herein. For example, the operations of the method 1200 may be performed by a communications manager as described with reference to FIGS. 5 through 8. In some examples, the wireless device may execute a set of codes to control the functional elements of the wireless device to perform the functions described herein. Additionally or alternatively, the wireless device may perform aspects of the functions described herein using special-purpose hardware.

At 1205 the wireless device may receive, from a first wireless device, a first wireless transmission over a channel of a radio frequency spectrum band, a preamble of the first wireless transmission including an indication of resources for an interference avoidance request corresponding to the first wireless transmission. The operations of 1205 may be performed according to the methods described herein. In certain examples, aspects of the operations of 1205 may be performed by a preamble processor as described with reference to FIGS. 5 through 8.

At 1210 the wireless device may detect interference by the first wireless transmission with a second wireless transmission from a third wireless device. The operations of 1210 may be performed according to the methods described herein. In certain examples, aspects of the operations of 1210 may be performed by an interference detector as described with reference to FIGS. 5 through 8.

At 1215 the wireless device may transmit the interference avoidance request to the first wireless device on the indicated resources based on the detected interference. The operations of 1215 may be performed according to the methods described herein. In certain examples, aspects of the operations of 1215 may be performed by an interference avoidance request generator as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:

transmitting, to a second wireless device, a wireless transmission over a channel of a radio frequency spectrum band, the wireless transmission comprising a data portion and a preamble that indicates resources for indicating interference corresponding to the wireless transmission and a first physical cell identifier (PCI) associated with the first wireless device;

receiving, from a third wireless device different from the second wireless device and via the resources indicated by the preamble, an indication of interference detected by the third wireless device, the indication of interference indicating that the wireless transmission from the first wireless device to the second wireless device interfered with communications between the third wireless device and a fourth wireless device, the fourth wireless device being different from the second wireless device and the third wireless device, wherein the indication of interference includes a preamble comprising a second PCI associated the third wireless device;

enabling an interference avoidance mechanism for a subsequent transmission to the second wireless device based at least in part on the indication of interference received from the third wireless device;

mapping a set of available resources to the first PCI associated with the first wireless device and the second PCI associated with the third wireless device; and implementing the interference avoidance mechanism based at least in part on the mapping.

2. The method of claim 1, wherein the preamble comprises a PCI associated with a wireless cell, the first wireless device, and the second wireless device.

3. The method of claim 1, wherein enabling the interference avoidance mechanism comprises:

applying one or more of: a frequency-division multiplexing (FDM) scheme, a time-division multiplexing (TDM) scheme, a spatial multiplexing scheme, or a combination thereof, to the subsequent transmission over the channel based at least in part on the received indication of interference.

4. The method of claim 1, wherein enabling the interference avoidance mechanism comprises:

implementing the interference avoidance mechanism for a first period of time; and stopping the implementation of the interference avoidance mechanism after the first period of time.

5. The method of claim 4, wherein the first period of time varies based at least in part on one of a channel condition or a traffic condition.

6. The method of claim 1, wherein enabling the interference avoidance mechanism comprises:

performing a listen before talk (LBT) procedure on the channel prior to performing the subsequent transmission over the channel.

7. The method of claim 1, wherein:

the wireless transmission is transmitted on a first frequency band; and enabling the interference avoidance mechanism comprises transmitting one or more additional wireless transmissions to a receiver on a second frequency band, the second frequency band being different than the first frequency band.

8. A method for wireless communications at a second wireless device, comprising:

receiving, from a first wireless device different from the second wireless device, a first wireless transmission over a channel of a radio frequency spectrum band, the first wireless transmission comprising a data portion and a preamble that indicates resources for indicating interference corresponding to the first wireless transmission and a first physical cell identifier (PCI) associated with the first wireless device;

detecting interference of the first wireless transmission with a second wireless transmission, the second wireless transmission corresponding to communications between a third wireless device and a fourth wireless device, the fourth wireless device being different from the second wireless device and the third wireless device;

transmitting, to the first wireless device and via the resources indicated by the preamble, an indication of interference indicating that the first wireless transmission from the first wireless device interfered with the second wireless transmission between the third wireless device and the fourth wireless device, wherein the indication of interference includes a preamble comprising a second PCI associated the third wireless device;

enabling an interference avoidance mechanism at the first wireless device based at least in part on the indication of interference;

mapping a set of available resources to the first PCI associated with the first wireless device and the second PCI associated with the third wireless device; and implementing the interference avoidance mechanism based at least in part on the mapping.

9. The method of claim 8, wherein enabling the interference avoidance mechanism comprises:

applying one or more of a frequency-division multiplexing (FDM) scheme, a time-division multiplexing (TDM) scheme, a spatial multiplexing scheme, or a combination thereof, to a subsequent transmission over the channel based at least in part on the indication of interference.

10. The method of claim 8, wherein the second wireless transmission comprises a second preamble indicating second resources for a second indication of interference corresponding to the second wireless transmission.

11. The method of claim 10, further comprising:

transmitting the second indication of interference on the indicated second resources.

12. The method of claim 8, wherein the preamble comprises a PCI associated with a wireless cell, the first wireless device, and the second wireless device.

13. The method of claim 12, further comprising:

transmitting an indication of the PCI to the third wireless device.

14. The method of claim 8, wherein:

the first wireless transmission is received on a first frequency band; and subsequent wireless transmissions from the second wireless device are received on a second frequency band, the second frequency band being different than the first frequency band.

15. An apparatus for wireless communications at a first wireless device, comprising:

a processor;

memory in electronic communication with the processor; and instructions stored in the memory, wherein the instructions are executable by the processor to:

transmit, to a second wireless device, a wireless transmission over a channel of a radio frequency spectrum band, the wireless transmission comprising a data portion and a preamble that indicates resources for indicating interference corresponding to the wireless transmission and a first physical cell identifier (PCI) associated with the first wireless device;

receive, from a third wireless device different from the second wireless device and via the resources indicated by the preamble, an indication of interference detected by the third wireless device, the indication of interference indicating that the wireless transmission from the first wireless device to the second wireless device interfered with communications between the third wireless device and a fourth wireless device, the fourth wireless device being different from the second wireless device and the third wireless device, wherein the indication of interference includes a preamble comprising a second PCI associated the third wireless device;
enable an interference avoidance mechanism for a subsequent transmission to the second wireless device based at least in part on the indication of interference received from the third wireless device;
map a set of available resources to the first PCI associated with the first wireless device and the second PCI associated with the third wireless device; and
implement the interference avoidance mechanism based at least in part on the mapping.

16. The apparatus of claim 15, wherein the preamble comprises a PCI associated with a wireless cell, the first wireless device, and the second wireless device.

17. The apparatus of claim 15, wherein the instructions executable by the processor to enable the interference avoidance mechanism comprise instructions executable by the processor to:
apply one or more of: a frequency-division multiplexing (FDM) scheme, a time-division multiplexing (TDM) scheme, a spatial multiplexing scheme, or a combination thereof, to the subsequent transmission over the channel based at least in part on the received indication of interference.

18. The apparatus of claim 15, wherein the instructions executable by the processor to enable the interference avoidance mechanism comprise instructions executable by the processor to:
implement the interference avoidance mechanism for a first period of time; and
stop the implementation of the interference avoidance mechanism after the first period of time.

19. The apparatus of claim 15, wherein the instructions executable by the processor to enable the interference avoidance mechanism comprise instructions executable by the processor to:
perform a listen before talk (LBT) procedure on the channel prior to performing the subsequent transmission over the channel.

20. An apparatus for wireless communications at a second wireless device, comprising:
a processor;
memory in electronic communication with the processor; and
instructions stored in the memory, wherein the instructions are executable by the processor to:
receive, from a first wireless device different from the second wireless device, a first wireless transmission over a channel of a radio frequency spectrum band, the first wireless transmission comprising a data portion and a preamble that indicates resources for indicating interference corresponding to the first wireless transmission and a first physical cell identifier (PCI) associated with the first wireless device;
detect interference of the first wireless transmission with a second wireless transmission, the second wireless transmission corresponding to communications between a third wireless device and a fourth wireless device, the fourth wireless device being different from the second wireless device and the third wireless device;
transmit, to the first wireless device and via the resources indicated by the preamble, an indication of interference indicating that the first wireless transmission from the first wireless device interfered with the second wireless transmission between the third wireless device and the fourth wireless device, wherein the indication of interference includes a preamble comprising a second PCI associated the third wireless device;
enable an interference avoidance mechanism at the first wireless device based at least in part on the indication of interference;
map a set of available resources to the first PCI associated with the first wireless device and the second PCI associated with the third wireless device; and
implement the interference avoidance mechanism based at least in part on mapping.

* * * * *